May 10, 1938.  F. CONRAD ET AL  2,117,018

BATTERY CHARGING SYSTEM

Filed March 4, 1936   2 Sheets-Sheet 1

WITNESSES:

INVENTORS
Frank Conrad &
Gilbert C. Goode
BY
ATTORNEY

May 10, 1938.  F. CONRAD ET AL  2,117,018
BATTERY CHARGING SYSTEM
Filed March 4, 1936  2 Sheets-Sheet 2

INVENTORS
Frank Conrad &
Gilbert C. Goode
BY O.B.Buchanan
ATTORNEY

Patented May 10, 1938

2,117,018

UNITED STATES PATENT OFFICE 2,117,018

BATTERY-CHARGING SYSTEM

Frank Conrad, Wilkinsburg, Pa., and Gilbert C. Goode, Birmingham, Mich., assignors of one-half to Westinghouse Electric & Manufacturing Company, East Pittsburgh, Pa., a corporation of Pennsylvania, and one-half to Chrysler Corporation, Detroit, Mich., a corporation of Delaware Application March 4, 1936, Serial No. 67,056

9 Claims. (Cl. 171—313)

Our invention relates to a commercially practicable (or low-cost) battery-charging system for self-propelled transportation-devices, or vehicles or conveyances for air, land, sea, or undersea travel, including airships, trains, automobiles, ships and submarines. It is designed to perform so much better, and to cost so much less, than the conventional battery-charging system utilizing direct-current generators, which have been standard for several decades, as to eventually substantially replace the direct-current generator system.

According to our invention, we provide a very small high-frequency alternating-current generator which may cost something like one-tenth or one-fifth as much as the present direct-current charging-generator, but which is so designed that it inherently delivers an approximately constant current after a certain minimum speed has been reached, so that, when combined with any suitable type of rectifying-device, it may be utilized to supply a charging current which does not exceed a predetermined maximum limit, and which, in effect, remains constant over a wide range of speeds of operation of the transportation-device. The total cost of the constant-current high-frequency generator and the rectifying device is less than the cost of the corresponding direct-current generator, and our new equipment operates much better.

According to our invention, we avoid all of the common direct-current generator troubles, including burn-outs due to overloading at high speeds, the many soldered joints, commutator and brush troubles, particularly with the three-brush arrangement which is used for regulating purposes, breakage of the rotor conductors due to centrifugal force, and troubles in the cut-out member and in the bearings, neither of which is needed in our new design.

According to our invention, we preferably utilize, for the rotor member of our alternator, the flywheel which is already provided on the shaft of the prime mover of the translating-device, so that no additional bearings, and practically no additional expense, is involved in providing the rotor-member of our alternator. This flywheel, or any part thereof, including either the flywheel-proper or the portion of the clutch which is ordinarily associated therewith, in automobiles, has an annular portion thereof which is toothed or provided with salient magnetizable polar projections, and these teeth may be formed integrally in the process of forming the flywheel member or part, either by casting or by punching, according to the method of design, at practically no additional manufacturing cost.

The stator-member of our alternator preferably consists of a very small member which spans only a small part of the periphery of the annular toothed portion of the rotor member. This stator-member is provided with direct-current windings adapted to be energized from the storage battery, and it is also provided with teeth somewhat matching the rotor teeth, except that the stator teeth are provided with an alternating-current winding, whereas the rotor teeth are plain or unwound. The tooth-flux pulsations generate a high-frequency alternating current in the alternating-current tooth-winding, after the manner of a so-called "inductor-type" alternator; and the design may easily be made so that this alternating current is of an approximately constant value, after a certain predetermined minimum speed has been reached, corresponding to a low cruising speed of the transportation-device.

The rectifying means which we utilize is preferably of the dry or contact type, such as a copper-oxide rectifier, although it might easily be an electrolytic rectifier, a thermionic rectifier, a vapor-electric rectifier, a vibrating mechanical rectifier, or a rotating commutator-type rectifier.

While practically every individual feature and step of our apparatus and system has been known heretofore, we base our principal claim to invention on the novel organization and arrangement or conjoint use of various old or known features in a new combination, in an industry which constitutes one of the major industries of the world, and in which the value of the machines which are sold in a single year is so great as to repel the supposition that any rugged, simple means or combination for effecting a material saving in manufacturing-cost, as well as a material improvement in operating-performance, was obvious or within the reach of the many experts who have been constantly engaged in this industry over a long period of years. Thus, we recognize that inductor-type alternators operating on the tooth-flux-pulsation principle have been known before; that so-called phonic-wheel-type alternators have been known before, with constant-speed equipment, in the more or less unrelated fields of radio-broadcasting and television, consisting of a large toothed rotor-wheel and a small segmentally extending stator-member somewhat similar to ours, utilized either as a generator of a small amount of power for heterodyning purposes, or as a synchronizing motor for a television scanning-disc; that variable-speed high-frequency magnetos and alternators have been utilized before, at a frequency sufficiently high so that the inductance of the circuit predominated and produced a substantially constant-current effect, for supplying alternating current to flashlights and bicycle lamps; and that inductor-type alternators have been utilized before, for battery charging circuits of transportation-devices, but in combinations in which the constant-current effect was not predominant, and in which voltage-regulators were necessary in order to control the output of the alternator, which was rectified into direct-current and utilized for charging the battery of the translating-device.

Various detailed features and objects of our invention will be apparent from the following description and appended claims, in connection with the accompanying drawings, wherein—

Figure 1:
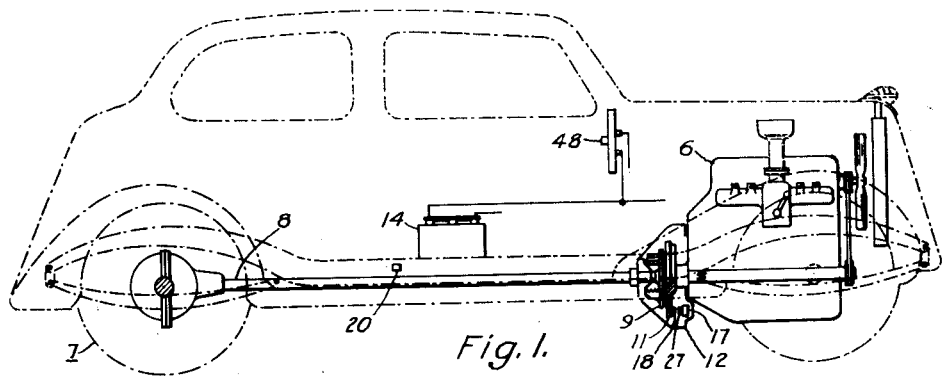
Figure 1 is a side view of an automobile, as a typical translating-device embodying our invention, with certain parts indicated in phantom or dot-and-dash lines, for convenience in illustration.

In Fig. 1, we show a self-propelled transportation-device embodying our invention. As illustrated, this transportation-device is an automobile, comprising a prime mover 6, and a propelling-means in the form of a rear-wheel aggregate 7 which is energized from said prime mover through suitable means including a propeller-shaft 8 and a clutch 9. The prime mover is of a type having a cyclically varying torque, necessitating the use of a flywheel 11, which is commonly associated with the clutch-mechanism 9, the whole being enclosed in a clutch-housing 12 through which air is circulated for cooling or ventilating purposes.

The transportation-device ordinarily and necessarily requires the maintenance of an auxiliary electrical system of relatively small power, necessitating the use of a storage battery 14 which must be charged by some suitable means.

In accordance with our invention, we provide an alternator-means, normally deriving power from the prime mover 6 and delivering alternating current at an approximately constant value at all speeds higher than a predetermined minimum speed corresponding to a low cruising speed of the transportation-device.

As shown in Fig. 1, our alternator-means is mounted within a small protuberance pressed in the clutch-housing 12. The only special electrical equipment needed for our alternator-means is a small stator-member 17 which is disposed alongside of the flywheel 11, the latter being provided with notches or teeth 18, as is more clearly shown in Figs. 3 and 4. According to our invention, the approximately constant alternating-current output of the alternator is converted into approximately constant direct current by a suitable rectifier-means which may consist of a small contact rectifier, such as a copper-oxide rectifier 20, which is mounted in any place, as underneath the car, where the rectifier is maintained in the cool condition which is necessary for its successful operation.

Figure 3:
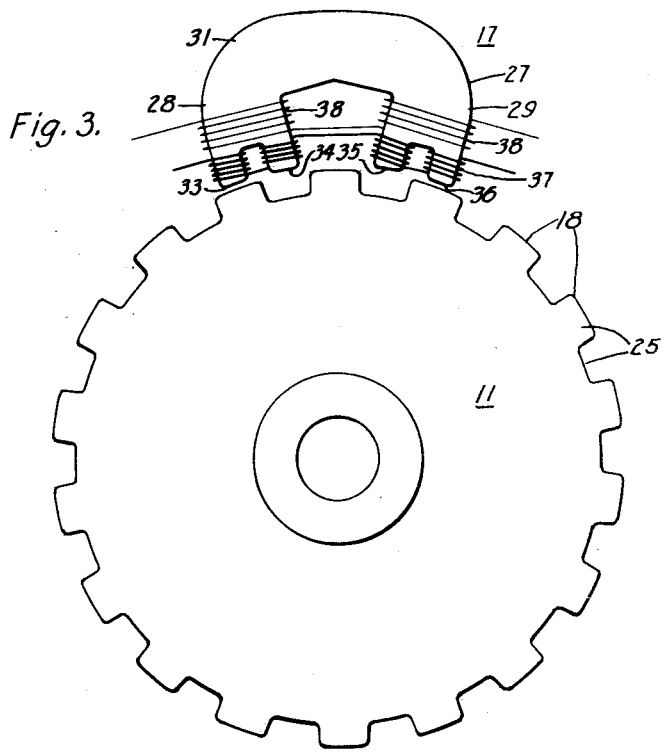
Figs. 3 and 4 are somewhat diagrammatic views illustrative of the construction of two different forms of the embodiment of the inductor-type alternator which we prefer to utilize.
Figure 4:
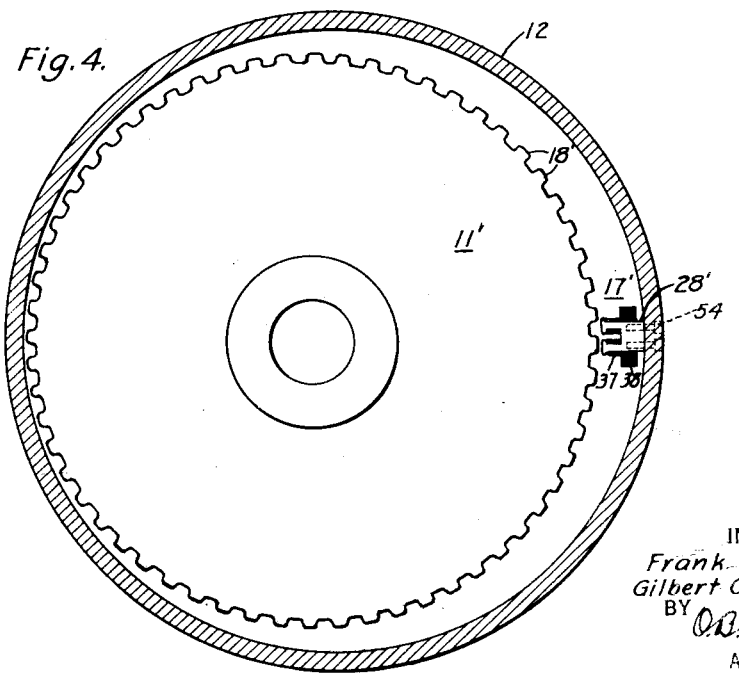

As shown in Figs. 3 and 4, our alternator utilizes, as its rotor-member, a simple toothed wheel 11, or a wheel having a toothed annular portion 25 which is provided with the teeth 18. At least the toothed annular portion of the rotor-member must be of magnetizable material. In general, the entire rotor-member will be cast in a single piece. The teeth 18 may project either radially or laterally from the rotor-wheel 11:— in Fig. 1, the teeth project laterally; whereas in Figs. 3 and 4, the teeth project radially; the electrical effect being the same in either case.

While we may refer to the magnetizable teeth 18 of the rotor-wheel as being projections, it is obvious that these teeth need to be projections only in a magnetic or flux-carrying sense, as the space between the magnetizable teeth may be filled in with relatively non-magnetizable material, without seriously affecting the electrical operation. In general, however, there is no particular object in filling the spaces between the teeth 18 with relatively non-magnetizable material, and also the use of projecting teeth is distinctly advantageous in operating as vanes for producing a lively circulation of air in the clutch-housing 12, thus providing much needed cooling for the clutch member 9. In the appended claims, we wish the term "teeth" to be construed broadly, in the magnetic or flux-carrying sense.

In accordance with our invention, the rotor-wheel 11 is preferably the flywheel of the prime mover 6, or a wheel carried by the prime-mover shaft and driven either positively, or frictionally as in a vibration-damper, the diameter of said wheel corresponding to a diameter suitable for a flywheel for said prime mover. This obviates the necessity for a separate moving part, which must itself be manufactured, and must be provided with bearings and a drive device, cooling means, and the like, so that the rotor-member for our alternator-means does not involve any material additional cost. It will be noted that the flywheel 11 of the prime mover 6, in Fig. 1, is composed of two parts, namely, a flywheel-proper, which is commonly cast, and a rotating clutch-part which is commonly punched out of heavy-sectioned steel. It is quite obvious that the teeth 18 may be provided on either one of these flywheel-parts, or on any other wheel mounted on the prime-mover shaft, according to the convenience or judgment of the designer. In a broader sense, our invention contemplates the use of a rotor-wheel deriving power in any manner, either directly or indirectly, from the prime mover.

It is an important feature of our invention that the rotor-member shall be of a relatively large size, corresponding to a diameter normally expected of a generator or alternator of much larger output than the electrical power actually delivered by our alternator-means. This use of a large rotor-member provides a high peripheral speed and makes possible the use of a large number of teeth which may be operated at a moderately low flux-density. The high peripheral speed results in a reduction of the size of the special electrical equipment which is necessary to put into the stator-member 17, because the electromotive force which is generated in any armature winding is directly proportional to the speed, so that any given armature winding will produce more electrical power the higher the speed of the rotor-member. The large number of rotor teeth increases the frequency of the generated alternating current, and the high frequency makes it convenient to have the inductance of the output-circuit predominate, or at least to have it sufficiently large to contribute materially to the production of an approximately constant magnitude of the current-output of the generator, because the inductance of a circuit varies with the frequency, and the frequency and voltage of the generator vary as the speed, so that the inductive impedance of the circuit increases as fast as the voltage increases, as the speed is being increased. The significance of a low flux-density in the rotor-member is that the tooth-structure 18 does not need to be laminated, thereby making it feasible to utilize a solid or thick-sectioned magnetizable rotor-member of relatively poor magnetic qualities, such as cast iron. We thus save the expense of a special laminated flux-carrying part on the rotor-member; although it is possible that such rotor-laminations may be found advantageous in some few equipments where unusually large amounts of power are required, or where the size or cost of the stator-member would otherwise become excessive.

The stator-member 17 of our alternator-means is a small-span member, the principal flux-carrying portion of which spans only a small part of the periphery of the toothed annular portion 25 of the rotor-member 11; and when we say "periphery," we mean the circumferential extent, without limiting ourselves to a stator-member which is outside of the rotor-member, as in Figs. 3 and 4, as distinguished from a stator-member which is alongside of the rotor-member, as in Fig. 1, either construction being intended. In either event, the stator-member is separated from the rotor-member by means of a small air gap, as is usual in dynamo-electric machines.

In the form of embodiment of our invention shown in Fig. 3, the stator-member 17 is in the form of a small bundle of segmental punchings 27 (Figs. 1 and 3) of magnetizable material, the same comprising a pair of salient magnetizable polar members 28 and 29 (Fig. 3) of opposite unidirectional polarities, and a magnetizable yoke-member 31 joining the polar members 28 and 29. Each of the pole faces of the polar members, or the portions of the polar members which terminate in the air gap which separates the stator-member from the rotor-member, is sub-divided into at least one pair of stator-teeth 33, 34 and 35, 36, respectively. The relative spacings of the stator-teeth 33, 34 and 35, 36 and the rotor-teeth 18 are such as to cause pulsations of the flux in the stator-teeth as the rotor-teeth pass under them during the rotation of the rotor-member; and the stator-teeth are provided with an alternating-current winding 37 composed of serially connected, oppositely wound coils, so as to produce a resultant alternating voltage which is dependent upon the tooth-flux pulsations. The alternating-current winding 37 is commonly referred to as an armature winding, because it is the winding in which an electromotive force is generated, but this winding is not mounted on the rotor-member of the machine, but on the teeth of the stator-member or field-member of the machine.

Any means may be utilized for driving a substantially constant flux through the segmental stator member, so as to interlink also with the spanned portion of the rotor-member. As shown, a field-winding 38 is preferably utilized for this purpose, said field-winding being disposed on the salient polar members 28 and 29 of the stator-punchings.

Figure 2:
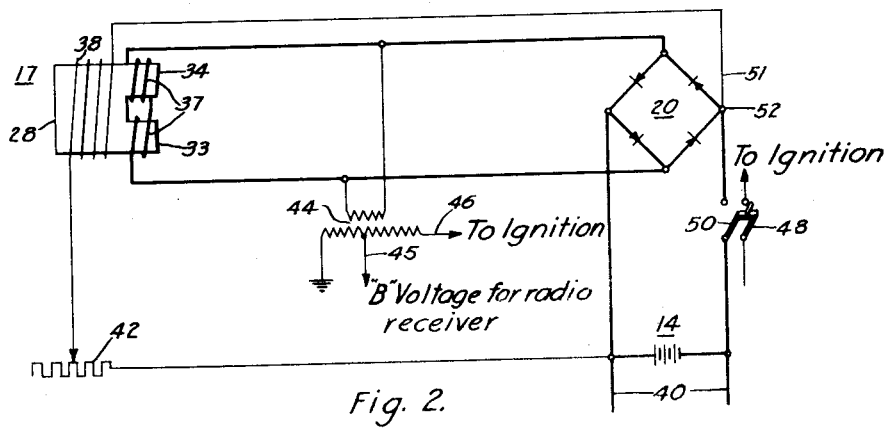
Fig. 2 is a diagrammatic view of electrical circuits and apparatus illustrating our invention.

The electrical circuit connections are indicated in Fig. 2. The output of the armature winding 37 is rectified by means of a preferably full-wave rectifier 20, which converts the high-frequency alternating current into direct current, which is supplied to a direct-current electrical circuit 40 which is utilized for auxiliary purposes on the transportation-device. The storage battery 14 normally floats across this direct-current circuit 40, supplying energy thereto when the prime mover is not operating, and regulating the voltage of the approximately constant-current output of the alternator when the prime mover is operating.

The field-winding 38 of the alternator is adapted to be energized across the battery-circuit 40, so that the field-winding will receive an approximately constant current, and will thus provide an approximately constant magnetic flux for exciting the alternator. Preferably, also, the excitation of the field-winding 38 is made adjustable, to provide not only for a shop-adjustment of the charging-rate to suit the individual machine, but also, if desired, to provide a means whereby the charging-rate may be changed, in operation, either to suit the condition of charge or discharge of the battery 14, or to suit the particular load-conditions on the direct-current circuit 40. Any convenient field-adjusting or presetting means may be utilized for this purpose: for simplicity of illustration, we have shown a field-resistor 42, which we wish to be understood as a symbolic representation of any field-varying means or any voltage-regulator or any automatic overvoltage-responsive device for limiting the current supplied to the battery when the latter is in its fully charged condition.

In operation, with any particular field-setting of the field-adjusting means 42, the field-winding 38 produces an approximately constant-flux energization in the alternator. The flux being approximately constant, the voltage and the frequency of the alternator-output will both vary approximately proportionately to the same variable, namely the speed. The design is such that, at a low operating speed, such as, say, 500 revolutions per minute, or about 9 miles per hour cruising-speed of the transportation-device, the alternator generates enough voltage to begin to charge the battery 14 through the rectifier 20. As the speed increases, the charging current steadily increases until the minimum critical speed of the order of, say, 1200 to 1400 revolutions per minute, or about 21 to 24 miles per hour, is reached, at which time the generator-current has reached its approximately constant value, after which the current does not rise greatly, no matter how fast the speed becomes.

When we say, "approximately constant current," we do not mean anything like an exactly constant current, but simply a current which does not reach unreasonably large values, even at the highest generator-speeds, thus avoiding the danger of burn-outs in the generator, such as were a common fault of third-brush direct-current generators. For instance, a 20 or 30% variation in the current during the "approximately constant" period may easily be tolerated, or the design may be made so that the variation is considerably less than this amount.

The design of the alternator to produce this approximately constant-current effect involves the utilization of the armature reaction of the generator to produce this operation. The armature reaction consists of two principal factors, one being the demagnetizing armature reaction, or the demagnetizing effect of the armature current on the field flux, and the other being the inductance of the armature windings.

At the moment when one of the rotor-teeth 18 is directly under (or opposite) the stator-tooth 33, for example, the other stator-tooth 34 of that pole piece is opposite to a large gap in the rotor-member, between the rotor-teeth, tending to cause the entire stator flux to pass through the tooth 33 and across the small air gap into the mating rotor-tooth 18. The armature current in the winding on the tooth 33 is in such direction, however, as to oppose the magnetomotive force of the field-winding 38 on the polar member 28, so that the effective magnetomotive force tending to produce flux is equal to the field ampere-turns on the polar member 28, minus the armature ampere-turns on the tooth 33. Thus, under load conditions, the flux in the stator-teeth, such as 33 and 34, does not attain the full no-load value, but is reduced by the demagnetizing armature reaction.

At the same moment, the armature ampere-turns on the tooth 34, which is opposite a rotor gap, and which should have very little flux in it, is additive with respect to the field ampere-turns, thus producing a stronger magnetomotive force tending to send flux across the large gap into the iron of the rotor-member, so that the flux in the tooth 34 does not become zero.

During the rotation of the rotor-member, the flux in the stator teeth thus pulses from a maximum value to a minimum value, both of which values are considerably short of the no-load values when there is no armature reaction. This depression of the field-flux pulsations is obviously dependent upon the magnitude of the armature current and the relative numbers of field ampere-turns and armature ampere-turns and it has a distinct effect in tending to prevent abnormal increases in the value of the armature current.

To give some general idea of the magnitudes of the forces involved, without, of course, limiting ourselves to any particular design, it may be mentioned that we have produced satisfactory results with a field-winding having about 400 turns, carrying 3.5 amperes, on each field pole-piece, and an armature-winding having 6 turns, carrying a maximum of 35 amperes, on each stator-tooth. In any given generator, it is usually found that the constant-current effect is augmented by increasing the armature ampere-turns with respect to the field ampere-turns. In order to obviate the use of fine wires in the armature winding, we usually prefer to make the armature current as large as possible, decreasing the armature turns and connecting all the armature coils in series, rather than utilizing a shunt connection of coils, although this feature is not essential.

There is obviously a second part of the armature reaction, and that is the inductive impedance or inductance of the armature-windings. This depends not only upon the number of turns, but also upon the frequency, this being one of the reasons why a high frequency is desirable. In any given machine, the inductance varies with the frequency, and the frequency varies in accordance with the same variable (speed), which controls the voltage, assuming a constant setting of the field-rheostat 42, so that the inductance increases as fast as the voltage increases, and as the inductance constitutes a major portion of the impedance of the circuit, the remaining impedance being displaced 90 electrical degrees with respect to the inductive impedance, so that the two are added vectorially, it will be obvious that the general effect is to produce a fairly constant current. Both of these effects, namely, the demagnetizing armature reaction and the inductance, are believed to contribute to our approximately constant-current operation.

From the foregoing explanation, it will be perceived that we utilize a generator which approaches a constant-current characteristic, that is, a generator in which the voltage is not definitely fixed, but depends largely on whatever voltage is needed in order to drive the predetermined current through whatever load impedance there is. We then rectify this approximately constant alternating current and obtain an approximately constant direct current, which is fed into the battery-circuit 40. The voltage of this direct-current circuit is determined by the battery 14, and hence the voltage of the alternating-current output-circuit of the generator is also approximately fixed, through the transformation-ratio of the rectifier 20.

One of the advantages of our invention is that we may utilize the alternating-current output-circuit of the generator as a source of alternating-current on the transportation-device, without the necessity for first converting the generated current to direct current and then changing it back again into alternating current, as in the previous systems. As symbolic of means which may be utilized for the purpose just mentioned, we show a step-up transformer 44 which is connected across the generator output-circuit and which is utilized for any purpose to which alternating-current may be put, on the transportation-device, such as the "B" voltage circuit 45 of a radio receiver, and an alternating-current ignition-system 46. It will be observed that the regulating effect of the direct-current battery 14, operating back through the rectifier 20, produces a rather rough regulation of the alternating-current voltage which may be sufficient for some purposes.

We have described the rectifier-means 20 as preferably comprising a contact rectifier. We prefer to utilize some sort of asymmetrically conducting type of rectifier, or a means which readily conducts current in only one direction, as distinguished from a reversible rectifier, such as a mechanical vibrating rectifier, or a rotating commutator device, because the use of an asymmetrically conducting means obviates the necessity for a reverse-current cut-out, and it also obviates the use of a commutator with its attendant difficulties. The reverse current of an asymmetrically conducting rectifier, that is, the battery-discharging current tending to flow back from the battery through the rectifier in the wrong direction to the alternating-current circuits, is generally so small that it can safely be ignored, at least for short periods of time.

Thus, when the operator desires to place the prime mover 6 in condition for starting the same, it is quite feasible to immediately connect the armature winding 37 to the battery 14 through the asymmetrically conducting rectifier 20, before the prime mover is actually started, and without any fear of harming the battery 14, because the discharge-current in the reverse direction through the rectifier and into the low-resistance armature-winding 37 will be so small that it will not materially discharge the battery.

even in a considerable period of time. When the prime mover 6 is of the internal-combustion type, we find it convenient to utilize the ignition-switch 48 as a convenient controller-means which is utilized to perform a controller-operation necessary in the maintenance of an operative condition of the prime mover, and we tie in the operation of this controller-means with a separate switching-means 50 which performs at least one function and preferably two functions.

The first function of the switching-means 50 is carried out through a field-winding circuit 51 which is connected in series therewith and which serves to connect the field-winding 38 across the battery 14, whenever the aforementioned controller-operation is performed so as to place the prime mover in a condition ready for operation. Contrariwise, when said controller-operation is reversed, for example when the ignition-switch 48 is turned off, the field-winding is disconnected from the battery.

The second function of the switching-means 50 is carried out by the charging-connection 52, by which the rectifier-means 20 is connected between the armature-winding 37 and the battery 14.

Any suitable means may be utilized for causing the approximately simultaneous, or otherwise interdependent, operations of the ignition-switch 48 and the switching-means 50. As a conventional means to this end, we have illustrated the same as comprising a double-pole switch, although it will be readily understood that other equivalent means may be utilized for this purpose.

The only part of the stator-member 17 which really needs to be laminated is the part carrying the high-frequency winding 37, that is, the part carrying the stator-teeth 33, 34, etc. The yoke part of the stator-winding does not need to be laminated because it carries a substantially constant flux. The stator pole-pieces 28, 29 may, therefore, be formed as separate laminated members which are simply secured to any iron housing-member which serves as the yoke-member for carrying the return-flux. Also, where the electrical-output requirements are not too great, it is entirely feasible to utilize only one direct-current pole-piece, letting the return-flux get back from the rotor-member to the rear side of the stator pole-piece by any convenient means, through iron parts which are usually present anyway or which may be especially provided.

As illustrative of the principles of design which have just been mentioned, we have shown a form of embodiment of our generator, in Fig. 4, wherein only one stator pole-piece 28' is utilized, the same being constructed as previously described for Fig. 3, except that only one pole-piece is used to constitute the entire stator-member 17'. This pole-piece is secured, as by bolts 54, to the clutch-housing 12, which must be made of magnetizable material, as is customary anyway.

The advantages of an extremely high frequency have already been indicated. As illustrative of a step in the direction of increasing the frequency, we have shown our invention, in Fig. 4, as being embodied in a design utilizing a rotor-member 11' having 60 teeth 18', as distinguished from an 18-tooth design as shown in Fig. 3. The frequencies obtained in the generator vary with the speed; in an 18-tooth generator, a frequency of 1035 cycles per second is obtained at a speed of about 60 miles per hour of the transportation-device, or 3450 revolutions per minute of the generator and prime mover; in a 60-tooth generator, a frequency of 3450 cycles is obtained at the same speed. These frequencies are only illustrative, as both higher and lower, as well as intermediate, frequencies may be utilized.

From the foregoing description it will be perceived that we have produced a battery-charging apparatus and system for self-propelled transportation-devices, achieving improved performance and simplification of design, as compared with the previously standard battery-charging system. Our stator punchings require no machining, being merely bolted onto any convenient support, and they may be fitted with machine-wound coils, so that the cost of manufacture may be extremely small.

While we have illustrated our invention in some preferred forms of embodiment, it will be understood that such illustration is largely exemplary and that various changes, modifications and adaptations may be made by those skilled in the art without departing from the essential principles of our invention, at least in its broader aspects. We desire, therefore, that the appended claims should be accorded the broadest construction consistent with their language and the prior art.

We claim as our invention:

1. In a self-propelled transportation-device having a prime mover, and propelling-means energized from said prime mover, a commercially practicable combination, cooperating with said prime mover, of an auxiliary electrical system of relatively small power, comprising a direct-current electrical circuit for auxiliary purposes, a storage battery normally floating across said direct-current circuit, an inductor type alternator-means normally deriving power from said prime mover and normally delivering an approximately constant alternating current at speeds of the prime mover higher than a speed corresponding to a low cruising speed of the transportation-device, said alternator-means comprising a relatively large rotor-member, a relatively small stator-member spanning much less than the entire periphery of the rotor-member, said rotor-member having an annular toothed portion of magnetizable material, the number of rotor teeth being at least as high as a number of the order of 18, said stator-member having a portion thereof spaced from the annular toothed portion of the rotor-member by an air-gap, said portion of the stator-member being also toothed and of magnetizable material, the stator and rotor teeth being so spaced, circumferentially, as to produce high-frequency tooth-flux pulsations, and a winding-means so disposed on the stator teeth as to produce a resultant alternating voltage dependent upon said tooth-flux pulsations, rectifier-means, and means for connecting said rectifier-means between said alternator-means and said direct-current circuit.

2. In a self-propelled transportation-device having a prime mover, and propelling-means energized from said prime mover, a commercially practicable combination including a rotating shaft deriving power from said prime mover, a rotor-member carried by said shaft, said rotor-member having an annular toothed portion of magnetizable material, a stator-member having a portion thereof spaced from the annular toothed portion of the rotor-member by an air gap, said portion of the stator-member being also toothed and of magnetizable material, said toothed portion of the stator-member spanning considerably less than the entire periphery of the rotor-member, means associated with said stator-member for, at times, applying thereto a substantially constant magnetomotive force for producing a flux which interlinks with the spanned portion of the rotor-member, the relative spacings of the stator-teeth and the rotor-teeth being such as to cause pulsations of the flux in said stator-teeth as the rotor-teeth pass under them during the rotation of the rotor-member, an alternating-current winding so disposed on the stator-teeth as to produce a resultant alternating voltage dependent upon said tooth-flux pulsations, whereby the alternating voltage and frequency are both approximately proportionate to the speed, the number of rotor-teeth being sufficiently high, at least as high as a number of the order of 18, so that said alternating-current winding delivers alternating current at a frequency sufficiently high to permit the use of a relatively small-span stator-member, the armature reaction of the alternator being sufficiently predominant to cause the alternating-current output to be at an approximately constant current under said approximately constant-flux excitation at all speeds of the prime mover higher than a speed corresponding to a low cruising speed of the transportation-device, rectifier-means for converting said approximately constant alternating current into approximately constant direct current, a direct-current electrical circuit for auxiliary purposes, a storage battery floating across said direct-current circuit, and means for connecting the direct-current output-terminals of said rectifier-means to said battery.

3. A commercially practicable device for deriving a relatively small amount of relatively high-frequency, approximately constant current from a relatively slow, variable-speed rotating shaft with a relatively small amount of special electrical equipment, comprising a relatively large wheel carried by said shaft, the diameter of said wheel corresponding to a diameter normally expected of a generator of much larger output than the electrical power actually delivered by the device, said wheel comprising a relatively thick-sectioned toothed annular portion of magnetizable material constituting a simple rotor-member of an alternator, the number of rotor teeth being at least as high as a number of the order of 18, and special electrical equipment associated therewith and comprising a stator-member having a portion thereof spaced from the annular toothed portion of the rotor-member by an air gap, said portion of the stator member being also toothed and of magnetizable material, but being composed of stacked laminations of magnetizable material thinner than the magnetizable material of the rotor-member, said toothed portion of the stator-member spanning considerably less than the entire periphery of the rotor-member, means associated with said stator-member for normally applying thereto a substantially constant magnetomotive force for producing a flux which interlinks with the spanned portion of the rotor-member, the relative spacings of the stator-teeth and the rotor-teeth being such as to cause pulsations of the flux in said stator-teeth as the rotor-teeth pass under them during the rotation of the rotor-member, and an alternating-current winding so disposed on the stator-teeth as to produce a resultant alternating voltage dependent upon said tooth-flux pulsations.

4. In a commercially practicable electrical system; in combination; a variable-speed, inductor-type dynamo-electric machine comprising a toothed magnetizable rotor-member, the number of rotor teeth being at least as high as a number of the order of 18, a toothed magnetizable stator-member having the principal flux-carrying portion thereof spanning considerably less than the entire periphery of the rotor-member, an exciting winding carried by said stator-member for driving therethrough a flux interlinking with the spanned portion of the rotor-member, the relative spacings of the stator-teeth and the rotor-teeth being such as to cause pulsations of the flux in said stator-teeth as the rotor-teeth pass under them during the rotation of the rotor-member, and an alternating-current winding so disposed on the stator-teeth as to produce a resultant alternating voltage dependent upon said tooth-flux pulsations; a direct-current load-circuit, an alternating-current circuit of large inductance energized from a source of voltage including said inductor-type dynamo-electric machine, and rectifying-means normally connected between said alternating-current circuit and said direct-current load-circuit.

5. In a commercially practicable electrical system; in combination; a variable speed, inductor-type dynamo-electric machine comprising a toothed magnetizable rotor-member, the number of rotor teeth being at least as high as a number of the order of 18, a stator-member comprising at least one pair of salient magnetizable polar members of opposite unidirectional polarities, a magnetizable yoke-member joining the polar members of said pair, said polar members spanning much less than the entire periphery of said rotor-member, each of the pole faces of said polar members being subdivided into at least one pair of stator-teeth, and an alternating-current winding disposed on said stator-teeth in such manner that the portions thereof on the two stator-teeth of any pair of stator-teeth are in series with each other and oppositely wound with respect to the respective teeth, the relative spacings of the stator-teeth and the rotor-teeth being such as to cause the flux in one stator-tooth of any pair of stator-teeth to be substantially a maximum when the flux in the other stator-tooth of said pair of stator-teeth is substantially a minimum; a direct-current load-circuit, an alternating-current circuit of large inductance energized from a source of voltage including said inductor-type dynamo-electric machine, and rectifying-means normally connected between said alternating-current circuit and said direct-current load-circuit.

6. In a commercially practicable electrical system; in combination; a variable-speed, inductor-type dynamo-electric machine comprising a toothed magnetizable rotor-member, the number of rotor teeth being at least as high as a number of the order of 18, a stator-member comprising only a single pair of salient magnetizable polar members of opposite unidirectional polarities, a magnetizable yoke member joining the polar members of said pair, said polar members spanning much less than the entire periphery of said rotor-member, each of the pole faces of said polar members being subdivided into a plurality of stator-teeth, the relative spacings of the stator-teeth and the rotor-teeth being such as to cause pulsations of the flux in said stator-teeth as the rotor-teeth pass under them during the rotation of the rotor-member, and an alternating-current winding so disposed on the startor-teeth as to produce a resultant alternating voltage dependent upon said tooth-flux pulsations; a direct-current load-circuit, an alternating-current circuit of large inductance energized from a source of voltage including said inductor-type dynamo-electric machine, and rectifying-means normally connected between said alternating-current circuit and said direct-current load-circuit.

7. In a commercially practicable electrical system; in combination; a variable-speed, inductor-type dynamo-electric machine comprising a toothed magnetizable rotor-member, the number of rotor teeth being at least as high as a number of the order of 18, a stator-member comprising only a single pole-piece of unidirectional polarity having a toothed pole-face portion spanning only a small part of the periphery of the rotor-member and spaced therefrom by an air gap, a magnetizable yoke member for providing a return-path for the flux between the single pole-piece and the rotor-member, at least the toothed pole-face portion of said pole-piece being laminated, the relative spacings of the stator-teeth and the rotor-teeth being such as to cause pulsations of the flux in said stator-teeth as the rotor-teeth pass under them during the rotation of the rotor-member, and an alternating-current winding so disposed on the stator-teeth as to produce a resultant alternating voltage dependent upon said tooth-flux pulsations; a direct-current load-circuit, an alternating-current circuit of large inductance energized from a source of voltage including said inductor-type dynamo-electric machine, and rectifying-means normally connected between said alternating-current circuit and said direct-current load-circuit.

8. In a commercially practicable electrical system, the combination, with a prime mover having a cyclically varying torque, of means for economically converting only a small portion of the prime-mover output into electrical energy, said means comprising a wheel carried by the prime-mover shaft, the diameter of said wheel corresponding to a diameter suitable for a flywheel for said prime mover, said wheel comprising a relatively thick-sectioned toothed annular portion of magnetizable material constituting a simple rotor-member of an inductor-type alternator, the number of rotor teeth being at least as high as a number of the order of 18, a stator-member having a portion thereof spaced from the annular toothed portion of the rotor-member by an air gap, said portion of the stator-member being also toothed and of magnetizable material, said toothed portion of the stator-member spanning considerably less than the entire periphery of the rotor-member, means associated with said stator-member for, at times, applying thereto a substantially constant magnetomotive force for producing a flux which interlinks with the spanned portion of the rotor-member, the relative spacings of the stator-teeth and the rotor-teeth being such as to cause pulsations of the flux in said stator-teeth as the rotor-teeth pass under them during the rotation of the rotor-member, an alternating-current winding so disposed on the stator-teeth as to produce a resultant alternating voltage dependent upon said tooth-flux pulsations, and a rectifying-means associated with said alternating-current winding.

9. In a self-propelled transportation-device including a prime mover having a cyclically varying torque, and propelling-means energized from said prime mover, a commercially practicable combination including means for economically converting only a small portion of the prime-mover output into electrical energy, said means comprising a wheel carried by the prime-mover shaft, the diameter of said wheel corresponding to a diameter suitable for a flywheel for said prime-mover, said wheel comprising a toothed annular portion of magnetizable material constituting a simple rotor-member of an inductor-type alternating-current generator, a casing surrounding said wheel, the number of rotor teeth being at least as high as a number of the order of 18, a small-span stator-member disposed in said casing, said stator-member comprising a toothed magnetizable portion cooperating with the rotor teeth, means associated with said stator-member for producing a unidirectional flux, an alternating-current winding so disposed on the stator-teeth as to produce an alternating-current output dependent upon tooth-flux pulsations, the frequency of said alternating-current output being at least as high as a value of the order of 360 cycles per second at a prime-mover speed corresponding to a low cruising speed of said transportation-device, a rectifying-means associated with said alternating-current winding, and an auxiliary-service direct-current circuit for receiving the output of said rectifying-means, said direct-current circuit including a floating storage battery.

FRANK CONRAD.
GILBERT C. GOODE.